(12) United States Patent
Ide

(10) Patent No.: US 11,011,752 B2
(45) Date of Patent: May 18, 2021

(54) ALL SOLID FLUORIDE ION BATTERY

(71) Applicant: TOYOTA JIDOSHA KABUSHIKI KAISHA, Toyota (JP)

(72) Inventor: Kazuto Ide, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 559 days.

(21) Appl. No.: 15/814,876

(22) Filed: Nov. 16, 2017

(65) Prior Publication Data

US 2018/0159129 A1 Jun. 7, 2018

(30) Foreign Application Priority Data

Dec. 7, 2016 (JP) .............................. JP2016-237621

(51) Int. Cl.
| | |
|---|---|
| *H01M 4/58* | (2010.01) |
| *C01F 17/00* | (2020.01) |
| *H01M 10/05* | (2010.01) |
| *H01M 10/0562* | (2010.01) |
| *C01F 17/36* | (2020.01) |
| *C01G 21/16* | (2006.01) |
| *H01M 4/02* | (2006.01) |

(52) U.S. Cl.
CPC ............. *H01M 4/582* (2013.01); *C01F 17/36* (2020.01); *C01G 21/16* (2013.01); *H01M 10/05* (2013.01); *H01M 10/0562* (2013.01); *C01P 2002/72* (2013.01); *C01P 2002/85* (2013.01); *C01P 2006/40* (2013.01); *H01M 2004/027* (2013.01)

(58) Field of Classification Search
CPC .............................. H01M 4/582; C01F 17/36
See application file for complete search history.

(56) References Cited

U.S. PATENT DOCUMENTS

2008/0102373 A1 5/2008 Potanin

FOREIGN PATENT DOCUMENTS

JP 5517451 B2 6/2014

OTHER PUBLICATIONS

M. A. Reddy et al, "Batteries based on fluoride shuttle", Journal of Material Chemistry, 2011, vol. 21, pp. 17059-17062.
Rongeat et al., "Development of new anode composite materials for fluoride ion batteries", Journal of Materials Chemistry A, 2014, vol. 2, pp. 20861-20872 (12 pages total).

(Continued)

*Primary Examiner* — Stephan J Essex
(74) *Attorney, Agent, or Firm* — Sughrue Mion, PLLC

(57) ABSTRACT

An object of the present disclosure is to provide an all solid fluoride ion battery that has a favorable capacity property. The present disclosure achieves the object by providing an all solid fluoride ion battery comprising: a cathode layer, an anode layer, and a solid electrolyte layer formed between the cathode layer and the anode layer; wherein the anode layer includes a metal fluoride containing an M1 element, an M2 element, and a F element; the M1 element is a metal element that fluorination and defluorination occur at a potential, versus $Pb/PbF_2$, of −2.5 V or more; the M2 element is a metal element that neither fluorination nor defluorination occur at a potential, versus $Pb/PbF_2$, of −2.5 V or more; and the M2 element is a metal element that, when in a form of a fluoride, fluoride ion conductivity is $1\times10^{-4}$ S/cm or more at 200° C.

8 Claims, 4 Drawing Sheets
(2 of 4 Drawing Sheet(s) Filed in Color)

(56) References Cited

OTHER PUBLICATIONS

Gschwind et al., "Fluoride ion batteries: Theoretical performance, safety, toxicity, and a combinatorial screening of new electrodes", Journal of Fluorine Chemistry, 2016, vol. 182, pp. 76-90 (15 pages total).

ALL SOLID FLUORIDE ION BATTERY

TECHNICAL FIELD

The present disclosure relates to an all solid fluoride ion battery having a favorable capacity property.

BACKGROUND ART

As high-voltage and high-energy density batteries, for example, Li ion batteries are known. The Li ion battery is a cation-based battery utilizing: the reaction between a Li ion and a cathode active material; and the reaction between a Li ion and an anode active material. Meanwhile, as anion-based batteries, all solid fluoride ion batteries utilizing the reaction of a fluoride ion are known.

For example, Non-patent Literature 1 discloses an all solid fluoride ion battery comprising an anode using an anode mixture in which an active material (such as $BiF_3$ and $CuF_2$), a solid electrolyte, and an electron conductive material are mixed. For example, Non-patent Literature 1 discloses an anode mixture in which $La_{0.9}Ba_{0.1}F_{2.9}$ as a solid electrolyte and acetylene black as an electron conductive material are mixed with $BiF_3$. Also, for example, Patent Literature 1 discloses a technique of adding polymer or glass that inhibits destruction of a battery due to the expansion and contraction of an electrode, to at least one of a cathode, a solid electrolyte, and an anode of an all solid fluoride ion battery.

CITATION LIST

Patent Literature

Patent Literature 1: Japanese Patent No. 5517451

Non-Patent Literature

Non-patent Literature 1: M. A. Reddy et al, "Batteries based on fluoride shuttle", Journal of Material Chemistry 21 (2011), p. 17059-17062

SUMMARY OF DISCLOSURE

Technical Problem

Associated with the recent enhancement of battery performance, further improvement in the capacity property of a battery is required. The present disclosure has been made in view of the above circumstances, and a main object thereof is to provide an all solid fluoride ion battery having a favorable capacity property.

Solution to Problem

The accumulation of researches in order to achieve the object have led the present inventor to acquire knowledge that an all solid fluoride ion battery having a favorable capacity property may be obtained by using a metal fluoride containing specific metal elements, for an anode layer. The present disclosure is an invention based on the knowledge.

The present disclosure provides an all solid fluoride ion battery comprising: a cathode layer, an anode layer, and a solid electrolyte layer formed between the cathode layer and the anode layer; wherein the anode layer includes a metal fluoride containing an M1 element, an M2 element, and a F element; the M1 element is a metal element that fluorination and defluorination occur at a potential, versus $Pb/PbF_2$, of −2.5 V or more; the M2 element is a metal element that neither fluorination nor defluorination occur at a potential, versus $Pb/PbF_2$, of −2.5 V or more; and the M2 element is a metal element that, when in a form of a fluoride, fluoride ion conductivity is $1 \times 10^{-4}$ S/cm or more at 200° C.

According to the present disclosure, since the anode layer includes the metal fluoride containing the M1 element, the M2 element, and the F element, the anode layer may be formed, upon charge, in a state where the metal of the M1 element (active material) and the metal fluoride (solid electrolyte) containing the M2 element and the F element are dispersed at an atomic level. Meanwhile, an all solid fluoride ion battery having a favorable capacity property may be obtained since: the metal of the M1 element has high electron conductivity; the metal fluoride containing the M2 element and the F element has high fluoride ion conductivity; and further, the both are dispersed at an atomic level.

In the disclosure, the metal fluoride preferably has a composition represented by $M1_x M2_{(1-x)} F_y$, in which $0.75 \leq x \leq 0.95$ and y is a real number more than 0.

The present disclosure provides an all solid fluoride ion battery comprising: a cathode layer, an anode layer, and a solid electrolyte layer formed between the cathode layer and the anode layer; wherein the anode layer includes a metal of an M1 element, and a metal fluoride containing an M2 element and a F element, in which the metal of the M1 element and the metal fluoride are dispersed at an atomic level; the M1 element is a metal element that fluorination and defluorination occur at a potential, versus $Pb/PbF_2$, of −2.5 V or more; the M2 element is a metal element that neither fluorination nor defluorination occur at a potential, versus $Pb/PbF_2$, of −2.5 V or more; and the metal fluoride containing the M2 element and the F element has fluoride ion conductivity of $1 \times 10^{-4}$ S/cm or more at 200° C.

According to the present disclosure, since: the anode layer includes the metal of the M1 element and the metal fluoride containing the M2 element and the F element; and the metal of the M1 element and the metal fluoride are dispersed at an atomic level, an all solid fluoride ion battery having a favorable capacity property may be obtained.

In the disclosure, the M1 element is preferably a metal element that fluorination and defluorination occur at a potential, versus $Pb/PbF_2$, of −1.5 V or less. The reason therefor is to increase the battery voltage.

In the disclosure, the M1 element preferably contains at least one of a La element and a Ce element.

In the disclosure, the M2 element preferably contains metal elements of two kinds or more.

In the disclosure, the M2 element preferably contains at least one kind of a Ca element, a Ba element, a Li element, a Sr element, and a Y element.

Advantageous Effects of Disclosure

The all solid fluoride ion battery of the present disclosure exhibits effects such that a favorable capacity property may be obtained.

BRIEF DESCRIPTION OF DRAWINGS

The patent or application file contains at least one drawing executed in color. Copies of this patent or patent application publication with color drawings will be provided by the Office upon request and payment of the necessary fee.

DESCRIPTION OF EMBODIMENTS

The all solid fluoride ion battery of the present disclosure will be hereinafter described in detail.

Figure 1A:
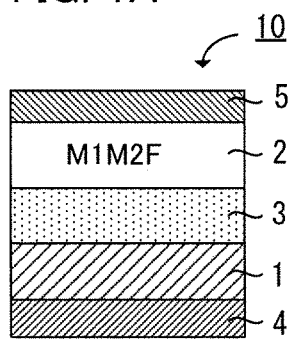
FIGS. 1A to 1C are schematic cross-sectional views each showing an example of the all solid fluoride ion battery of the present disclosure.
Figure 1B:
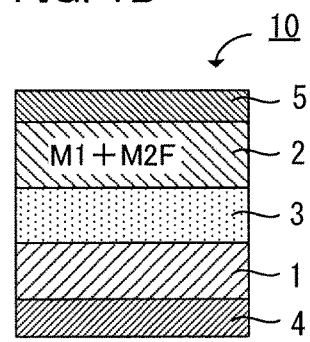
Figure 1C:
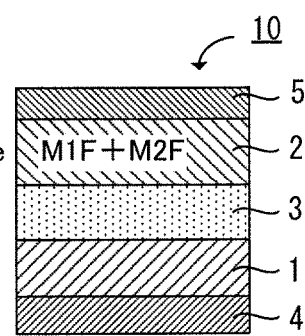

FIGS. 1A to 1C are schematic cross-sectional views each exemplifying the all solid fluoride ion battery of the present disclosure. FIG. 1A shows the initial state (the state before charge), FIG. 1B shows the state after charge, and FIG. 1C shows the state after discharge. All solid fluoride ion battery 10 shown in FIGS. 1A to 1C each comprises cathode layer 1, anode layer 2, solid electrolyte layer 3 formed between cathode layer 1 and anode layer 2, cathode current collector 4 for collecting currents of cathode layer 1, and anode current collector 5 for collecting currents of anode layer 2.

In all solid fluoride ion battery 10 shown in FIG. 1A, anode layer 2 includes a metal fluoride (M1M2F) containing an M1 element, an M2 element, and a F element. Upon charge of all solid fluoride ion battery 10, the defluorination reaction of the metal fluoride (M1M2F) occurs, and thereby, as shown in FIG. 1B, the metal of the M1 element (M1) and a metal fluoride (M2F) containing the M2 element and the F element, are formed in a state that they are dispersed at an atomic level. Here, when the M1 element is a metal element of one kind, the metal of the M1 element (M1) is a metal simple substance (M1 simple substance), and when the M1 element includes two kinds or more of metal elements, the metal of the M1 element (M1) is an alloy (M1 alloy). The metal of the M1 element (M1) corresponds to the anode active material in the charged state. Meanwhile, the metal fluoride (M2F) has the specific fluoride ion conductivity, and corresponds to the solid electrolyte. Incidentally, the F element content in M2F will be less than the F element content in M1M2F since defluorination reaction occurs upon charge; however, the expressions of M2F and M1M2F do not intend to express the F element content quantitatively.

When all solid fluoride ion battery 10 shown in FIG. 1B is discharged, the fluorination reaction occurs to the metal of the M1 element (M1) so as to form the fluoride of the M1 element (M1F), as shown in FIG. 1C. This fluoride of the M1 element (M1F) corresponds to the anode active material in the discharged state. Meanwhile, the metal fluoride (M2F) containing the M2 element and the F element, does not react upon discharge so as to be present as the solid electrolyte.

According to the present disclosure, since the anode layer includes the metal fluoride containing the M1 element, the M2 element, and the F element, the anode layer may be formed, upon charge, in a state where the metal of the M1 element (active material) and the metal fluoride (solid electrolyte) containing the M2 element and the F element are dispersed at an atomic level. Meanwhile, an all solid fluoride ion battery having a favorable capacity property may be obtained since: the metal of the M1 element has high electron conductivity; the metal fluoride containing the M2 element and the F element has high fluoride ion conductivity; and further, the both are dispersed at an atomic level.

Particularly in the present disclosure, the charged anode layer includes: a metal of an M1 element; and a metal fluoride containing an M2 element and a F element, and has a configuration in which the both are dispersed at an atomic level. In such an anode layer, extremely favorable electron conductive path and fluoride ion conductive path are formed so as to promote the electrode reaction; thus, an all solid fluoride ion battery having a favorable capacity property may be obtained. The reason for the both to be dispersed at an atomic level is because desorption of a fluoride ion from the metal fluoride (M1M2F) occurs upon charge, whereas the M1 element and the M2 element that are metal elements (cations) do not move.

Also, in the present disclosure, since it is possible to disperse the metal of the M1 element (M1) and the metal fluoride (M2F) containing the M2 element and the F element at an atomic level, it is possible to ensure fluoride ion conductivity even though the proportion of the metal fluoride (M2F), in other words, the solid electrolyte in the anode layer is low. Therefore, the proportion of the metal of the M1 element (M1), in other words, the anode active material in the anode layer may be increased so as to increase the anode layer capacity. Thus, the present disclosure allows the anode layer capacity property to be favorable.

In the present disclosure, the metal of the M1 element (M1) and the metal fluoride (M2F) are formed (phase split) from the metal fluoride (M1M2F) upon charge. Specifically, since the M1 element has higher fluorination potential and defluorination potential than the potentials of the M2 element, when the potential of the anode layer is lowered upon charge, the metal of the M1 element (M1) is generated from the metal fluoride (M1M2F), and the metal fluoride (M2F) remains.

Figure 2A:
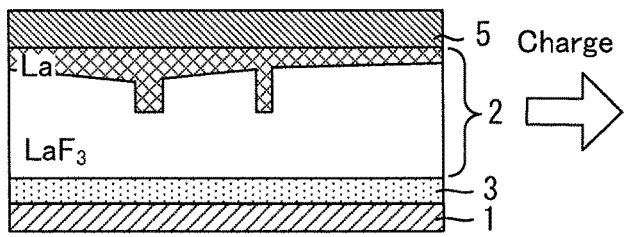
FIGS. 2A and 2B are schematic cross-sectional views explaining the charging reaction of an all solid fluoride ion battery using $LaF_3$.
Figure 2B:
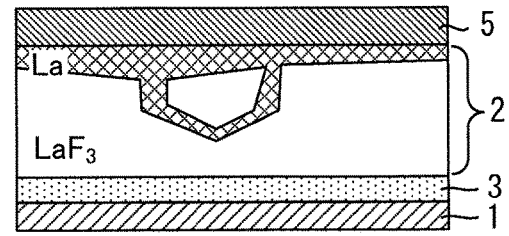

Compared to an anode layer using a metal fluoride (such as $LaF_3$) containing one kind of metal element, the capacity property of a battery may be improved dramatically with the anode layer in the present disclosure. Here, the reason why sufficient capacity property cannot be obtained in a battery using the above mentioned anode layer, is presumed as follows. Hereinafter, an example when $LaF_3$ is used as the anode layer will be explained. Here, ideally, the defluorination reaction of $LaF_3$ upon charge proceeds evenly in the thickness direction of anode layer 2 from anode current collector 5 side. However, as shown in FIG. 2A, the defluorination reaction actually proceeds unevenly in the thickness direction of anode layer 2 from anode current collector 5 side, and La simple substance (La) is generated unevenly (locally). Also, as shown in FIG. 2B, a state that $LaF_3$ is left behind among the La simple substance, is presumed to occur because of the proceeded uneven reaction. It is presumed that no further charging reaction is possible for $LaF_3$ since the fluoride ion conductive path to $LaF_3$ surrounded by the La simple substance, is cut off. Thus, it is presumed that the charging capacity is lowered since unreacted $LaF_3$ remains in the anode layer. Also, it is presumed that discharging capacity is lowered associated with the above.

Figure 3A:
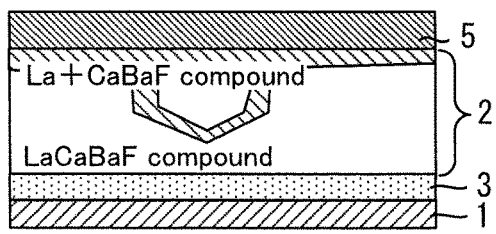
FIGS. 3A and 3B are schematic cross-sectional views explaining the charging reaction of the all solid fluoride ion battery of the present disclosure.
Figure 3B:
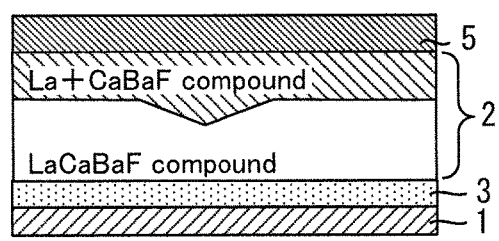

On the other hand, the anode layer in the present disclosure includes a metal fluoride containing an M1 element, an M2 element, and a F element. Hereinafter, an example when a LaCaBaF compound (M1=La, M2=Ca and Ba) is used as the metal fluoride will be explained. In the present disclosure, as shown in FIG. 3A, La simple substance (La) and CaBaF compound (such as $CaBaF_4$) are formed from the LaCaBaF compound upon charge, in a highly dispersed state. Therefore, as shown in FIG. 3A, even when defluorination reaction occurs unevenly, fluoride ions may be provided to an unreacted metal fluoride (the LaCaBaF compound). Thus, as shown in FIG. 3B, it is presumed that the unreacted metal fluoride (the LaCaBaF compound) is not likely to be remained in anode layer 2. Therefore, favorable charging capacity and discharging capacity are presumed to be obtained.

Figure 4:
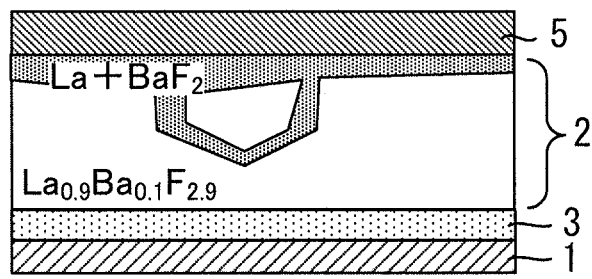
FIG. 4 is a schematic cross-sectional view explaining the charging reaction of an all solid fluoride ion battery using $La_{0.9}Ba_{0.1}F_{2.9}$.

Incidentally, as shown in the later described Comparative Example 2 (FIG. 4), when the fluoride ion conductivity of the obtained metal fluoride is low, in other words, when the obtained metal fluoride does not function as the solid electrolyte, favorable capacity property is not obtained even when La (metal simple substance) and $BaF_2$ (metal fluoride) are formed from $La_{0.2}Ba_{0.1}F_{2.9}$ in the anode layer. In this case, it is presumed that the metal fluoride functions as an insulant. In other words, in the present disclosure, since the metal fluoride containing the M2 element and the F element has the specific fluoride ion conductivity, and functions as the solid electrolyte, an all solid fluoride ion battery having a favorable capacity property may be obtained.

Figure 5:
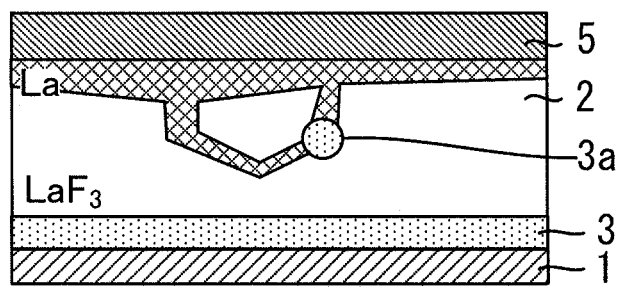
FIG. 5 is a schematic cross-sectional view explaining the charging reaction of an all solid fluoride ion battery using an anode mixture.

Further, the anode layer using an anode mixture, in which a powder shape anode active material and a powder shape solid electrolyte are mixed, will also be considered. As shown in FIG. 5, when the anode mixture is used, it is presumed that, since powder shape solid electrolyte 3a is added, the fluoride ion conductive path may be suppressed from being cut off even when the defluorination reaction occurs unevenly. However, in the anode layer using the anode mixture, with a small amount of solid electrolyte, it is difficult to secure the fluoride ion conductive path for the entire anode layer. Also, when the solid electrolyte is added to such an extent that the fluoride ion conductive path for the entire anode layer may be secured, there is a concern that the anode layer capacity itself is lowered since the portion of the anode active material in the anode layer will relatively be less. Further, there is a concern that the anode layer capacity itself is lowered since, in the anode mixture, a conductive material is added in many cases in order to secure the electron conductivity. Meanwhile, in the present disclosure, the anode layer may be formed upon charge, in a state where the metal of the M1 element (active material) and the metal fluoride (solid electrolyte) containing the M2 element and the F element are dispersed at an atomic level. As the result, the proportion of the metal of the M1 element (active material) in the anode layer may be increased so that the anode layer capacity may be increased.

The all solid fluoride ion battery of the present disclosure will be hereinafter described in each constitution.

1. Anode Layer

The anode layer in the present disclosure includes a metal fluoride. Further, the anode layer may or may not include a conductive material other than the metal fluoride; however, the latter is preferable. The reason therefor is to achieve higher capacity.

(1) Metal Fluoride

The metal fluoride preferably contains an M1 element, an M2 element, and a F element.

(i) M1 Element

The M1 element is a metal element that fluorination and defluorination thereof occur at higher potentials (with higher fluorination and defluorination potentials) than the potentials of the later described M2 element. The fluorination and defluorination potentials versus $Pb/PbF_2$ of the M1 element are usually −2.5 V or more, may be −2.4 V or more, and may be −2.3 V or more. Also, the fluorination and defluorination potentials versus $Pb/PbF_2$ of the M1 element are, for example, −1.5 V or less, may be −1.6 V or less, and may be −1.7 V or less.

Here, "potentials at which fluorination and defluorination of a metal element occur" refer to the fluorination and defluorination potentials of the metal element in an electrochemical meaning. Specifically, the "potentials at which fluorination and defluorination of a metal element occur" are thermaldynamic values determined from the equilibrium reaction ($M+F^- \leftrightarrow MF+e^-$) of a metal element (M element) and a F element, and are intrinsic values for each metal element.

In the all solid fluoride ion battery of the present disclosure, it is presumed that, since the F element directly reacts with the metal element upon charge and upon discharge, the fluorination reaction and defluorination reaction in the metal element occur, in theory, at the same potential, in other words, at a potential determined by the above mentioned equilibrium reaction.

The "potentials at which fluorination and defluorination of a metal element occur" may be measured by using, for example, cyclic voltammetry (CV).

Examples of the M1 element may include at least one kind of lanthanoid elements such as a La element, a Ce element, a Pr element, a Nd element, a Sm element, a Eu element, a Gd element, a Tb element, a Dy element, a Ho element, an Er element, a Tm element, an Yb element, and a Lu element; an Al element, a Be element, a Mg element, a Na element, a K element, a Rb element, a Cs element, a Sc element, a Th element, a Hf element, a Ti element, and a Zr element. The M1 element may be only one kind of the metal element, and may include two kinds or more of the metal elements; in the present disclosure, more preferably includes at least one of a La element and a Ce element. The proportion of the La element among all the M1 elements may be 50 mol % or more, may be 70 mol % or more, may be 90 mol % or more, and may be 100 mol % (La element only). The proportion of the Ce element among all the M1 elements, and the proportion of the La element and the Ce element among all the M1 elements are the same as the above mentioned proportion.

As mentioned above, the M1 element becomes the metal of the M1 element (M1 simple substance, M1 alloy) after charge.

(ii) M2 Element

The M2 element is a metal element that fluorination and defluorination thereof occur at lower potentials than the potentials of the M1 element. In other words, neither fluorination nor defluorination of the M2 element occur at the fluorination and defluorination potentials of the M1 element. Specifically, the M2 element is a metal element that neither fluorination nor defluorination thereof occur at the potential versus $Pb/PbF_2$ of −2.5 V or more. The fluorination and defluorination potentials versus $Pb/PbF_2$ of the M2 element are usually less than −2.5 V, may be −2.7 V or less, and may be −2.8 V or less. Also, the fluorination and defluorination potentials versus $Pb/PbF_2$ of the M2 element are, for example, −3.5 V or more. Also, the differences of the fluorination and defluorination potentials between the M1 element and the M2 element are, for example, preferably 0.05 V or more, and more preferably 0.1 V or more.

Also, the M2 element is a metal element that, when in a form of a fluoride, fluoride ion conductivity is $1\times10^{-4}$ S/cm or more at 200° C. More specifically, the M2 element is a metal element that, when in a form of a metal fluoride (M2F) containing the M2 element and the F element, the predetermined fluoride ion conductivity may be obtained. For example, in the later described Example, the fluoride ion conductivity of $Ca_{1-x}Ba_xF_2$, in which $0<x<1$, was $1\times10^{-4}$ S/cm or more at 200° C. The fluoride ion conductivity at 200° C. may be $5\times10^{-4}$ S/cm or more, and may be $1\times10^{-3}$ S/cm or more.

The fluoride ion conductivity refers to a fluoride ion conductivity of the fluoride (M2F) of the M2 element specified in the anode layer, in the form of a pressure powder molded body. Specific measuring method is as follows: first, 200 mg of fluoride (M2F) powder is filled into a Macor ceramic tube with diameter of 10 mm, and is subjected to uniaxial pressure molding under 1 ton/cm² to mold the fluoride into a pellet; after that, acetylene black (current collector) is stacked on both sides of the pellet, and pressed under pressure of 4 ton/cm²; the pressed stacked body is fastened with bolts under torque of 6 N·m to obtain an evaluation cell. An alternating current impedance measurement is carried out in measurement environment of under a vacuum of $10^{-3}$ Pa and at 200° C.; and at frequency within a range of $10^6$ Hz to $10^{-2}$ Hz and voltage magnitude of 50 mA. Thereby, fluoride ion conductivity at 200° C. may be obtained.

Examples of the metal element of the M2 element may include at least one kind of a Ca element, a Ba element, a Li element, a Sr element, and a Y element. The M2 element may be only one kind of the metal element, and may include two kinds or more of the metal elements; however, the latter is more preferable. When the M2 element includes two kinds or more of the metal elements, preferable combinations may include a Ca element and a Ba element.

(iii) Metal Fluoride

The metal fluoride preferably contains an M1 element, an M2 element, and a F element. The metal fluoride is usually a solid solution. The metal fluoride contains at least the M1 element and the M2 element as the metal elements; may contain only the M1 element and the M2 element; or may further contain an additional metal elements; however, the former is preferable. The total proportion of the M1 element and the M2 element among all the metal elements in the metal fluoride is, for example, 90 mol % or more. Meanwhile, the proportion of the M1 element with respect to the total of the M1 element and the M2 element is, for example, preferably 75 mol % or more, and more preferably 80 mol % or more. Also, the proportion of the M1 element is, for example, 95 mol % or less.

The metal fluoride preferably has a composition represented by, for example, $M1_xM2_{(1-x)}F_y$, in which $0.75 \leq x \leq 0.95$ and y is a real number more than 0. Here, the value of x is preferably 0.75 or more, and may be 0.8 or more. Also, the value of x is, for example, 0.95 or less.

Also, the value of y is usually a real number more than 0, and preferably determined stoichiometrically according to the valence of the M1 element and the M2 element in the metal fluoride. The value of y may be, for example, more than 2, may be 2.5 or more, and may be 2.75 or more. Also, the value of y may be, for example, less than 3, may be 2.95 or less, and may be 2.9 or less.

In an X-ray diffraction measurement of the metal fluoride using a CuKα ray, a peak is preferably observed at a position of $2\theta=24.20°\pm0.50°$, $24.80°\pm0.50°$, $27.64°\pm0.50°$, $34.90°\pm0.50°$, $43.63°\pm0.50°$, $44.71°\pm0.50°$, $49.50°\pm0.50°$, $50.48°\pm0.50°$, and $52.41°\pm0.50°$. These peak positions are peak positions based on the later described $La_{0.9}Ca_{0.06}Ba_{0.04}F_{2.9}$, and by setting the range of $\pm0.50°$, a crystal phase similar to that of $La_{0.9}Ca_{0.06}Ba_{0.04}F_{2.9}$ may be determined. Also, the range of the peak position may be $\pm0.30°$, and may be $\pm0.10°$.

Meanwhile, the anode layer after charge, for example, includes the metal of the M1 element (M1), and the metal fluoride (M2F) containing the M2 element and the F element, in which the metal of the M1 element (M1) and the metal fluoride (M2F) are dispersed at an atomic level. Being dispersed at an atomic level may be confirmed by, for example, an observation with a transmission electron microscope (TEM). When the anode layer includes the metal of the M1 element, and the metal fluoride containing the M2 element and the F element, the proportion of the M1 element with respect to the total of the M1 element and the M2 element is, for example, preferably 75 mol % or more, and more preferably 80 mol % or more. Also, the proportion of the M1 element is, for example, 95 mol % or less.

Examples of a method for preparing the metal fluoride may include, a method in which raw materials being an M1 element source, an M2 element source, and a F element source are mixed and heat treated. Examples of the M1 element source may include a metal fluoride containing the M1 element. Examples of the M2 element source may include a metal fluoride containing the M2 element. The heat treatment temperature is, for example, preferably within a range of 800° C. to 1100° C., and more preferably within a range of 900° C. to 1000° C. Examples of a heat treatment atmosphere may be under an inert gas (such as Ar gas) atmosphere.

(2) Anode Layer

The anode layer in the present disclosure includes the above mentioned metal fluoride. The main component of the anode layer is preferably the metal fluoride containing the M1 element, the M2 element, and the F element. The content of the metal fluoride in the anode layer is, for example, 70% by weight or more, may be 90% by weight or more, and may be 100% by weight. Also, the anode layer preferably includes the metal of the M1 element and the metal fluoride containing the M2 element and the F element as the main component. The total content of the metal of the M1 element and the metal fluoride in the anode layer is, for example, 70% by weight or more, may be 90% by weight or more, and may be 100% by weight.

The thickness of the anode layer varies greatly with the battery constitution, and thus is not particularly limited.

2. Cathode Layer

The cathode layer in the present disclosure is a layer containing a cathode active material of which fluorination reaction occurs upon discharge, and defluorination reaction occurs upon charge. The cathode active material is a material that fluorination and defluorination thereof occur at higher potentials than the potentials of the M1 element in the anode layer. Specifically, the fluorination and defluorination of the cathode active material preferably occur at a potential versus $Pb/PbF_2$ of 0 V or more.

Examples of the cathode active material may include a metal active material containing a metal element, and a carbon active material including a carbon element. Examples of the metal active material may include a metal simple substance and an alloy including a metal element that fluorination and defluorination thereof occur at higher potentials than the potentials of the M1 element. Examples of the metal element used for the metal active material may include at least one kind of a Pb element, a Cu element, a Ag element, a Mn element, an Fe element, a Ni element, a Co element, a W element, a Bi element, a Sn element, a Au element, a Pt element, a Mo element, a Cr element, a Pd element, and a Tl element. When the metal active material is an alloy, among a plurality of the metal elements, a metal element with the highest fluorination potential and defluorination potential (hereinafter referred to as metal element A) is preferably the main component of the alloy. The proportion of metal element A in the alloy may be 50 mol % or more, may be 70 mol % or more, and may be 90 mol % or more. Also, examples of the carbon active material may include graphite and graphene.

Examples of the shape of the cathode active material may include a granular shape and a film shape.

The thickness of the cathode layer varies greatly with the battery constitution, and thus is not particularly limited. Further, the cathode layer may also provide a function as a cathode current collector.

3. Solid Electrolyte Layer

The solid electrolyte layer in the present disclosure is a layer formed between the cathode layer and the anode layer, and including a solid electrolyte.

The reduction potential of the solid electrolyte used for the solid electrolyte layer is lower than the fluorination and defluorination potentials of the M1 element. The reduction potential versus $Pb/PbF_2$ of the solid electrolyte is usually $-2.5$ V or less, may be $-2.7$ V or less, and may be $-2.8$ V or less. Also, the reduction potential versus $Pb/PbF_2$ of the solid electrolyte may be, for example, $-3.5$ V or more. The reduction potential of the solid electrolyte may be measured by using, for example, cyclic voltammetry (CV).

The fluoride ion conductivity of the solid electrolyte at 200° C. is preferably $1\times10^{-4}$ S/cm or more, may be $5\times10^{-4}$ S/cm or more, and may be $1\times10^{-3}$ S/cm or more. The fluoride ion conductivity of the solid electrolyte may be measured by using an alternating current impedance method. Examples of such solid electrolyte may include a metal fluoride (M2F) containing the M2 element and the F element.

Also, the thickness of the solid electrolyte layer in the present disclosure varies greatly with the battery constitution, and thus is not particularly limited.

4. Other Constitutions

The all solid fluoride ion battery of the present disclosure comprises at least the above mentioned anode layer, cathode layer, and solid electrolyte layer. In the present disclosure, a cathode current collector for collecting currents of the cathode layer, and an anode current collector for collecting currents of the anode layer may further be included. Examples of the shape of the current collectors may include a foil shape.

The all solid fluoride ion battery of the present disclosure preferably includes a control section that controls charge. The control section, for example, is preferably a control section that controls charge so as the potential of the anode layer is a potential at which the defluorination of the M1 element occurs, and at which the defluorination of the M2 element does not occur. In the present disclosure, the potential versus $Pb/PbF_2$ of the anode layer upon charge is preferably controlled so as not to be less than $-2.5$ V. Also, the potential versus $Pb/PbF_2$ of the anode layer upon charge is preferably controlled so as to be $-1.5$ V or less.

The control section, for example, may include ECU (Electronic Control Unit) and PCU (Power Control Unit). The ECU (Electronic Control Unit) sends command (for example, start command or stop command) to the PCU to charge or discharge based on: the request (for example, charging request or discharging request) from the outside, and the potential and the voltage of the all solid fluoride ion battery. The PCU supplies electric power to the load upon discharge, and receives electric power from the power source upon charge.

5. All Solid Fluoride Ion Battery

The all solid fluoride ion battery of the present disclosure comprises at least: a cathode layer, an anode layer, and a solid electrolyte layer formed between the cathode layer and the anode layer. In the present disclosure, in the initial state for example, the anode layer includes a metal fluoride containing an M1 element, an M2 element, and a F element; the M1 element is a metal element that fluorination and defluorination occur at a potential, versus $Pb/PbF_2$, of $-2.5$ V or more; the M2 element is a metal element that neither fluorination nor defluorination occur at a potential, versus $Pb/PbF_2$, of $-2.5$ V or more; and the M2 element is a metal element that, when in a form of a fluoride, fluoride ion conductivity is $1\times10^{-4}$ S/cm or more at 200° C. Meanwhile, after charge for example, the anode layer includes a metal of an M1 element, and a metal fluoride containing an M2 element and a F element, in which the metal of the M1 element and the metal fluoride are dispersed at an atomic level; the M1 element is a metal element that fluorination and defluorination occur at a potential, versus $Pb/PbF_2$, of $-2.5$ V or more; the M2 element is a metal element that neither fluorination nor defluorination occur at a potential, versus $Pb/PbF_2$, of $-2.5$ V or more; and the metal fluoride containing the M2 element and the F element has fluoride ion conductivity of $1\times10^{-4}$ S/cm or more at 200° C.

The all solid fluoride ion battery of the present disclosure may be a primary battery or may be a secondary battery. Among the above, the secondary battery is preferable, so as to be repeatedly charged and discharged, and is useful as, for example, a car-mounted battery. Incidentally, the primary battery includes a usage of a secondary battery as a primary battery (the use for the purpose of just one time discharge after charge). Also, examples of the shape of the all solid fluoride ion battery of the present disclosure may include a coin shape, a laminate shape, a cylindrical shape, and a square shape.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure will be described in more details with reference to Examples.

Example 1

Synthesis of Metal Fluoride $LaF_3$, $CaF_2$ and $BaF_2$ were weighed so as to be La:Ca:Ba=76:9:15 in the molar ratio, and mixed by planetary ball milling at revolution of 600 rpm for 12 hours. The powder after the ball milling mixture was burned at 900° C. for 4 hours in an Ar atmosphere to obtain $La_{0.76}Ca_{0.09}Ba_{0.15}F_{2.76}$.

Incidentally, when the burning temperature is 850° C. or less, there is a possibility that impurities having a fluorite type structure are easily generated; and when over 1000° C., there is a possibility that oxide impurities are easily generated. Therefore, the burning temperature is preferably within a range of 900° C. to 1000° C., and 900° C. is more preferable.

Production of Measurement Cell

As a solid electrolyte, 150 mg of $Ca_{0.6}Ba_{0.4}F_2$ was weighed. The weighed solid electrolyte was subjected to uniaxial pressure molding under 1 ton/cm² to obtain a solid electrolyte layer (pressure powder molded body). On the obtained solid electrolyte layer, 10 mg of $La_{0.76}Ca_{0.09}Ba_{0.15}F_{2.76}$ was stacked, and was subjected to uniaxial pressure molding under 1 ton/cm² to obtain an anode layer. As an anode current collector, 3 mg of acetylene black was stacked.

Figure 6:
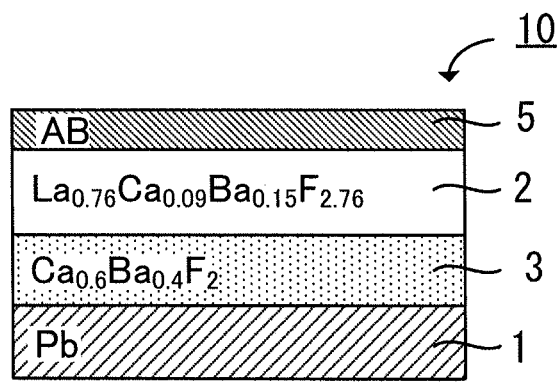
FIG. 6 is a schematic cross-sectional view showing the constitution of the measurement cell obtained in Example 1.

As a cathode layer, a Pb foil was stacked on the surface opposite to the solid electrolyte layer, and was subjected to uniaxial pressure molding under 4 ton/cm² to obtain a cell element. The obtained cell element was fastened under 6 N·m to obtain a measurement cell. The constitution of the measurement cell is shown in FIG. 6. Incidentally, the cathode layer also provides a function as a cathode current collector.

Example 2

A metal fluoride was obtained in the same manner as in Example 1 except that $LaF_3$, $CaF_2$ and $BaF_2$ were weighed so as to be La:Ca:Ba=90:6:4 in the molar ratio. The composition of the obtained metal fluoride was $La_{0.9}Ca_{0.06}Ba_{0.04}F_{2.9}$. Also, a measurement cell was obtained in the same manner as in Example 1 except that the obtained metal fluoride was used.

Comparative Example 1

A measurement cell was obtained in the same manner as in Example 1 except that $LaF_3$ heat treated at 800° C. was used as the metal fluoride.

Comparative Example 2

A metal fluoride was obtained in the same manner as in Example 1 except that $LaF_3$ and $BaF_2$ were weighed so as to be 90:10 in the molar ratio. The composition of the obtained metal fluoride was $La_{0.9}Ba_{0.1}F_{2.9}$. A measurement cell was obtained in the same manner as in Example 1 except that the obtained metal fluoride was used.

Comparative Example 3

An anode mixture was prepared by mixing $La_{0.9}Ba_{0.1}F_{2.9}$ and $Ca_{0.6}Ba_{0.4}F_2$ in a mortar at 9:1 in the weight ratio. The element ratio of this mixture was La:Ca:Ba=76:9:15 in the molar ratio, as in Example 1.

A measurement cell was obtained in the same manner as in Example 1 except that the obtained anode mixture was used.

[Evaluation]
Charge and Discharge Test

Figure 7:
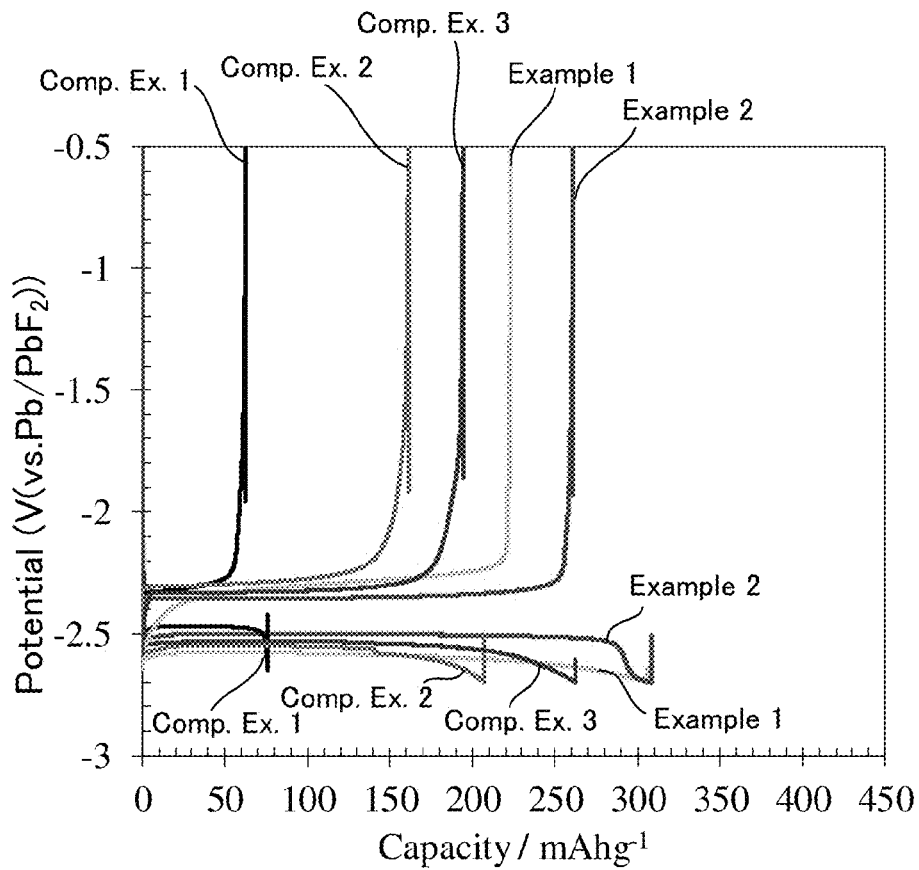
FIG. 7 shows the charging and discharging curves in Examples 1 and 2, and Comparative Examples 1 to 3.

A charge and discharge test was conducted for each measurement cell. The conditions for the charge and discharge were: under a vacuum environment of $1 \times 10^{-3}$ Pa or less, the measurement cell being heated to 200° C., within a range of −2.5 V (versus $Pb/PbF_2$) to −1.5 V (versus $Pb/PbF_2$), and charge and discharge rate of C/30. The results thereof are shown in FIG. 7 and Table 1. The charging and discharging curves in FIG. 7 show charging and discharging curves of the anode layers.

TABLE 1

| | Constitution of anode | Charging capacity per weight of anode layer (mAh/g) | Discharging capacity per weight of anode layer (mAh/g) |
|---|---|---|---|
| Example 1 | $La_{0.76}Ca_{0.09}Ba_{0.15}F_{2.76}$ | 306 | 223 |
| Example 2 | $La_{0.90}Ca_{0.06}Ba_{0.04}F_{2.9}$ | 309 | 261 |
| Comparative Example 1 | $LaF_3$ | 76.0 | 62.4 |
| Comparative Example 2 | $La_{0.90}Ba_{0.1}F_{2.9}$ | 207 | 161 |
| Comparative Example 3 | $0.9La_{0.90}Ba_{0.1}F_{2.9}$ + $0.1Ca_{0.06}Ba_{0.04}F_2$ | 262 | 194 |

As shown in FIG. 7 and Table 1, in Examples 1 and 2, the charging capacity per weight of each anode layer was confirmed to be a high value more than 300 mAh/g. Also, in Examples 1 and 2, the discharging capacity per weight of each anode layer was confirmed to be a high value more than 200 mAh/g.

In Examples 1 and 2, it is presumed that, upon the initial charge, a fluoride ion was desorbed from the LaCaBaF compound, and a state in which the La simple substance and the CaBaF compound were dispersed at an atomic level, was formed in the anode layer. Also, it is presumed that since the fluorination of the La simple substance occurred (functioned as an active material), and a small amount of the CaBaF compound functioned as a solid electrolyte, the charging capacity and the discharging capacity were improved.

Meanwhile, it was confirmed that, compared to Examples 1 and 2, the charging capacity and the discharging capacity were lower in Comparative Example 1. In Comparative Example 1, upon charge, a fluoride ion was desorbed from $LaF_3$, and only the La simple substance was generated. In Comparative Example 1, it is presumed that since the generation reaction (defluorination reaction) of the La simple substance in the anode layer proceeded unevenly, the fluoride ion conductive path in the anode layer was cut off so that the reaction was intercepted.

Also, it was confirmed that, compared to Examples 1 and 2, the charging capacity and the discharging capacity were lower in Comparative Example 2. In Comparative Example 2, it is presumed that, upon the initial charge, the La simple substance and $BaF_2$ were formed from $La_{0.9}Ba_{0.1}F_{2.9}$ in the anode layer. Since the fluoride ion conductivity of $BaF_2$ is very low such as about $1 \times 10^{-9}$ S/cm at 200° C., it is presumed that favorable charging capacity and discharging capacity were not obtained.

Also, it was confirmed that, compared to Examples 1 and 2, the charging capacity and the discharging capacity were lower in Comparative Example 3. Also, it was confirmed that, compared to Comparative Example 2, the charging capacity and the discharging capacity were higher in Comparative Example 3. In Comparative Example 3, $Ca_{0.6}Ba_{0.4}F_2$ (solid electrolyte) powder was mixed with $La_{0.9}Ba_{0.1}F_{2.9}$ powder so that the composition ratio was made equal to that in Example 1. However, it is presumed that the fluoride ion conductive path could not be sufficiently secured because of the inferior dispersion of the solid electrolyte powder in the anode layer.

From the above results, it was confirmed that in Examples 1 and 2, the capacity property of each all solid fluoride ion battery and the capacity property of each anode layer could be made favorable compared to Comparative Examples 1 to 3.

XRD Measurement

Figure 8:
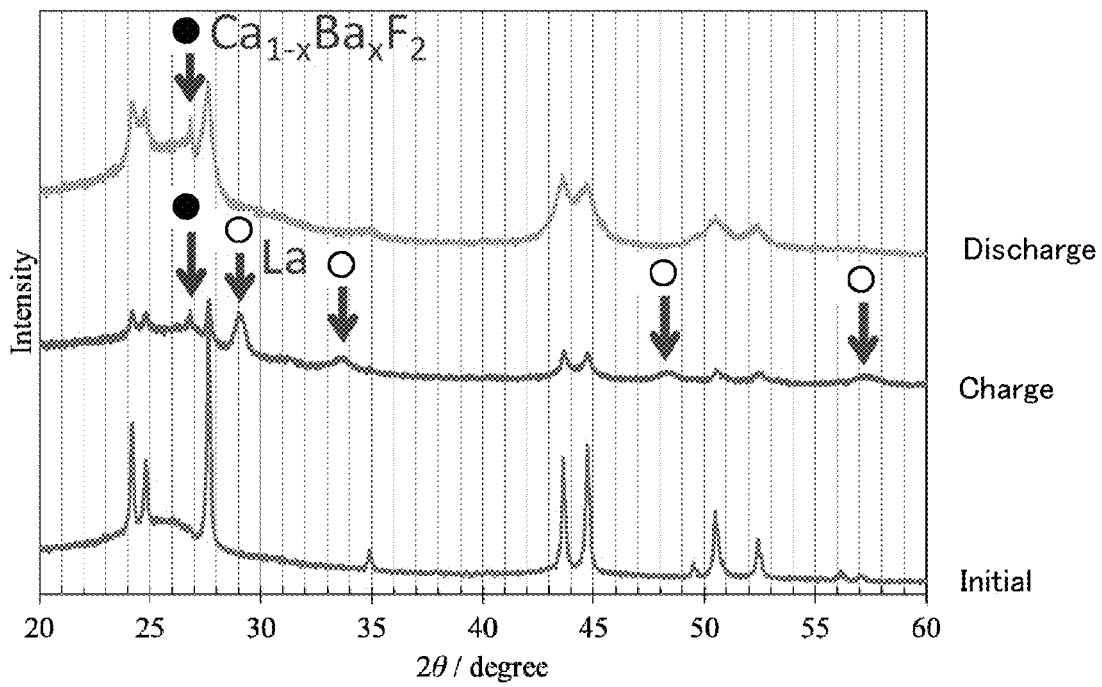
FIG. 8 is the results of XRD measurements in Example 2.
Figure 9A:
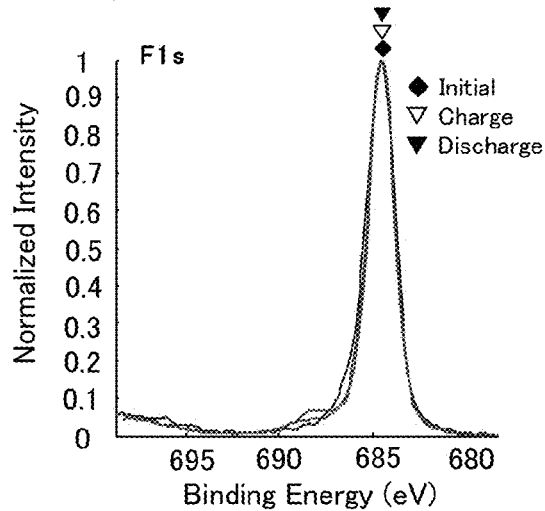
FIGS. 9A to 9E are the results of XPS measurements in Example 2.
Figure 9B:
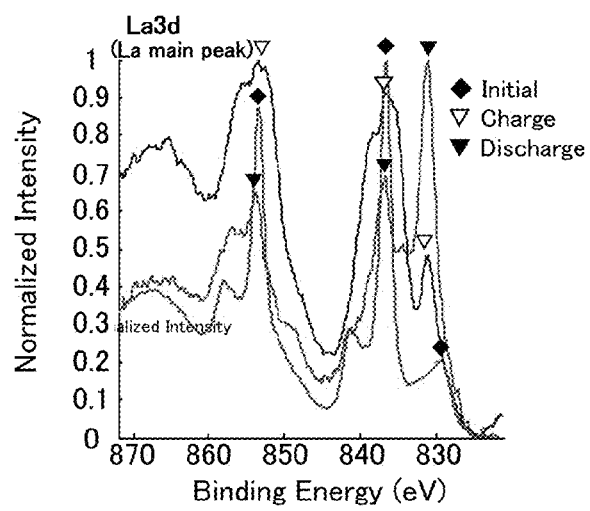
Figure 9C:
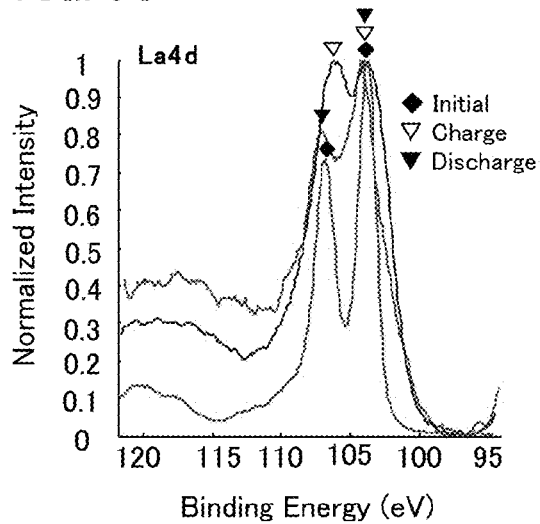
Figure 9D:
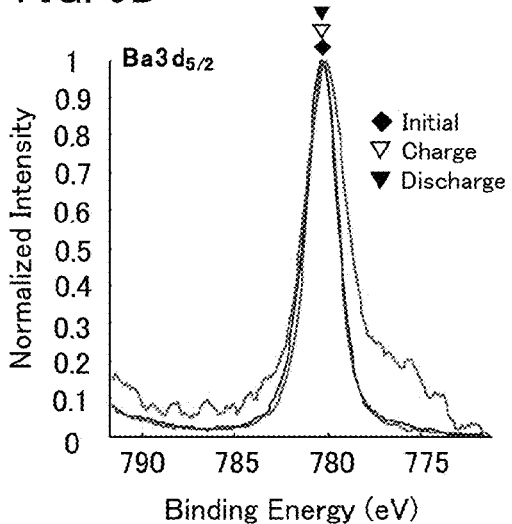
Figure 9E:
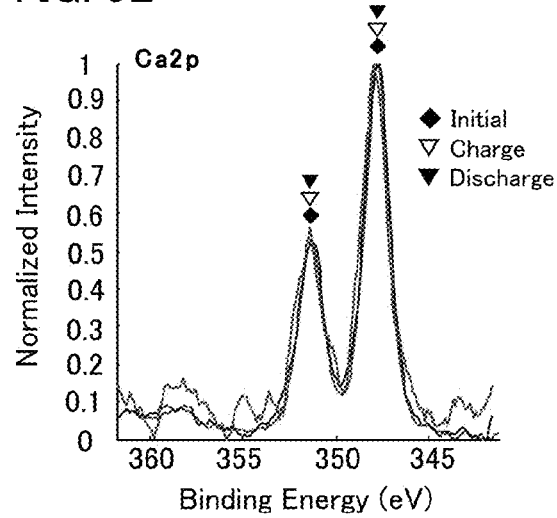

Powder XRD measurement was carried out to the metal fluoride in Example 2, at the initial state, after the initial charge, and after the initial discharge. The metal fluoride was filled in an XRD glass holder and was measured using a CuKα ray, within a range of 2θ=10° to 80°, at the scanning rate of 10°/min. The results thereof are shown in FIG. 8.

For the metal fluoride at the initial state, a peak was observed at the position of 2θ=24.20°, 24.80°, 27.64°, 34.90°, 43.63°, 44.71°, 49.50°, 50.48°, and 52.41°. All of these diffraction peaks belong to the peaks of $La_{0.9}Ca_{0.06}Ba_{0.04}F_{2.9}$.

For the metal fluoride after charge, the peaks belonging to $La_{0.9}Ca_{0.06}Ba_{0.04}F_{2.9}$ were smaller, and the peaks belonging to the La simple substance and the peaks belonging to the solid electrolyte $Ca_{(1-x)}Ba_xF_2$, in which 0<x<1, (CaBaF compound) were observed. After discharge, the peaks belonging to the La simple substance disappeared, and the peaks belonging to $LaF_3$ and the peaks belonging to CaBaF compound were observed. Incidentally, the peaks belonging to $LaF_3$ were observed at almost the same positions as those of $La_{0.9}Ca_{0.06}Ba_{0.04}F_{2.9}$.

From these results, in the anode layer using the metal fluoride of Example 2, it was confirmed that the metal fluoride was phase split, upon the initial charge, into the La simple substance and the CaBaF compound, and that irreversible reaction not returning to $La_{0.9}Ca_{0.06}Ba_{0.04}F_{2.9}$ occurred also after the initial discharge. In other words, in Example 2, it was confirmed that the metal fluoride containing the M1 element, the M2 element, and the F element were phase split, upon the initial charge, into the metal of the M1 element and the metal fluoride containing the M2 element and the F element; the fluorination of the metal of the M1 element phase split upon the initial discharge occurred so as to form the metal fluoride (M1F) containing the M1 element.

XPS Measurement

XPS measurement was carried out to the metal fluoride in Example 2, at the initial state, after the initial charge, and after the initial discharge in order to measure the peaks belonging to the La element, the Ca element, the Ba element, and the F element. The results thereof are shown in FIGS. 9A to 9E. As shown in FIGS. 9A to 9E, before and after charge and discharge, peak shifts and variations in peak strength associated with the oxidation-reduction reaction were observed only for the La element.

REFERENCE SIGNS LIST

1 cathode layer
2 anode layer
3 solid electrolyte layer
4 cathode current collector
5 anode current collector
10 all solid fluoride ion battery

What is claimed is:

1. An all solid fluoride ion battery comprising: a cathode layer, an anode layer, and a solid electrolyte layer formed between the cathode layer and the anode layer;
   wherein the anode layer includes a metal fluoride containing an M1 element, an M2 element, and a F element;
   the M1 element is a metal element that fluorination and defluorination occur at a potential, versus $Pb/PbF_2$, of −2.5 V or more;
   the M2 element is a metal element that neither fluorination nor defluorination occur at a potential, versus $Pb/PbF_2$, of −2.5 V or more;
   the M2 element is a metal element that, when in a form of a fluoride, fluoride ion conductivity is $1×10^{-4}$ S/cm or more at 200° C.;
   a content of the metal fluoride to a total weight of the anode layer is 70% by weight or more; and
   the M2 element contains metal elements of two kinds or more.

2. The all solid fluoride ion battery according to claim 1, wherein the metal fluoride has a composition represented by $M1_xM2_{(1-x)}F_y$, in which 0.75≤x≤0.95 and y is a real number more than 0.

3. The all solid fluoride ion battery according to claim 1, wherein the M1 element is a metal element that fluorination and defluorination occur at a potential, versus $Pb/PbF_2$, of −1.5 V or less.

4. The all solid fluoride ion battery according to claim 1, wherein the M1 element contains at least one of a La element and a Ce element.

5. The all solid fluoride ion battery according to claim 1, wherein the M2 element contains at least two kinds of a Ca element, a Ba element, a Li element, a Sr element, and a Y element.

6. The all solid fluoride ion battery according to claim 1, wherein the content of the metal fluoride to the total weight of the anode layer is 90% by weight or more.

7. The all solid fluoride ion battery according to claim 1, wherein the content of the metal fluoride to the total weight of the anode layer is 100% by weight.

8. The all solid fluoride ion battery according to claim 1, wherein the M1 element contains a La element, and the M2 element contains a Ca element and a Ba element.

\* \* \* \* \*